United States Patent
Kim (10) Patent No.: US 8,498,516 B2
(45) Date of Patent: Jul. 30, 2013

(54) PERSONAL VIDEO RECORDER AND CONTROL METHOD THEREOF FOR COMBINING FIRST AND SECOND VIDEO STREAMS

(75) Inventor: Eung Tae Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1734 days.

(21) Appl. No.: 10/893,979

(22) Filed: Jul. 20, 2004

(65) Prior Publication Data

US 2005/0019005 A1    Jan. 27, 2005

(30) Foreign Application Priority Data

Jul. 21, 2003   (KR) .................. 10-2003-0049753

(51) Int. Cl.
*H04N 5/92*      (2006.01)
*H04N 5/93*      (2006.01)
*H04N 5/76*      (2006.01)

(52) U.S. Cl.
USPC .......................................... 386/248; 386/278

(58) Field of Classification Search
None
See application file for complete search history.

(56) References Cited

U.S. PATENT DOCUMENTS

| | | | |
|---|---|---|---|
| 2003/0033502 A1* | 2/2003 | Matsuzaki | 712/200 |
| 2003/0093790 A1* | 5/2003 | Logan et al. | 725/38 |
| 2003/0110513 A1* | 6/2003 | Plourde et al. | 725/134 |
| 2003/0131362 A1* | 7/2003 | Jasinschi et al. | 725/134 |
| 2003/0177503 A1* | 9/2003 | Sull et al. | 725/112 |
| 2003/0215214 A1* | 11/2003 | Ma | 386/52 |

FOREIGN PATENT DOCUMENTS

| | | |
|---|---|---|
| KR | 1999-0077703 A | 10/1999 |
| KR | 2000-0056179 A | 9/2000 |
| KR | 10-2002-0026169 A | 4/2002 |

* cited by examiner

*Primary Examiner* — William C Vaughn, Jr.
*Assistant Examiner* — Heather Jones
(74) *Attorney, Agent, or Firm* — Birch, Stewart, Kolasch & Birch, LLP (57) ABSTRACT

The present invention provides a PVR system and control method thereof, by which a user is facilitated to synthesize and combine a multitude of videos or broadcast programs. The present invention includes a decoder selecting at least one of a plurality of reception video streams to decode the selected video stream, a PVR engine reading a first index file including video features and addresses of previously stored video streams, the PVR engine generating a second index file including video features and addresses of the selected video stream, the PVR engine links the first and second index files to each other to combine the previously stored video stream and the selected video stream, and a storage means for storing the video streams and the index files corresponding to the video streams.

21 Claims, 5 Drawing Sheets

PERSONAL VIDEO RECORDER AND CONTROL METHOD THEREOF FOR COMBINING FIRST AND SECOND VIDEO STREAMS

This application claims the benefit of the Korean Application No. P2003-49753 filed on Jul. 21, 2003, which is hereby incorporated by reference.

BACKGROUND OF THE INVENTION

1. Field of the Invention

The present invention relates to a personal video recorder (PVR), and more particularly, to a personal video recorder and control method thereof, by which functions of recording, editing (mixing), and playing back a video from a digital video display device are provided.

2. Discussion of the Related Art

Generally, such an encoder as MPEG (moving picture experts group) is used in home appliances field including digital TV, digital camcorder, and the like to reduce both storage and transfer capacities of digital video or audio. Specifically, in digital TV and set-top box (STB), the digital storage system using such a digital storage medium as HDD and DVD (digital versatile disc) is used instead of the analog storage system using conventional VTR (video tape recorder).

The digital camcorder needs an encoder having a complicated standard of MPEG series and should include both encoder and decoder. Lately, a simple compression encoding standard is provided to overcome problems of the MPEG-series encoder that has to perform computation of motion estimation and compensation. The encoding standard of the digital camcorder is disclosed in 'International standard CEI/IEC 61834-2, Recording—Helical-scan digital video cassette recording system using 6.35 mm magnetic tape for consumer use (525-60, 625-50, 1125-60 and 1250-50 systems)—Part 2: SD format for 525-60 and 625-50 systems' and is generally called DV (digital video) format.

The conventional PVR function is limited to storing a TV program corresponding to another channel on mainly viewing one specific program, viewing a TV program stored in HDD via time-shift function, or storing/playing back digital TV signals in/from HDD. Demand for a PVR device equipped with processing and storing functions of various video input signals such as a digital camcorder, digital camera, and the like is raised. For this, instead of preparing or combining the respective chips meeting various types, a system price reduction and system integration enhancement via one unified video decoding chip are more efficient.

Recently, according to the tendency of the HDD capacity increase and price reduction, user's need for storing several video tapes taken by a camcorder in HDD as one file or storing to keep a series or weekend dramas of a broadcasting station into one file is raised.

SUMMARY OF THE INVENTION

Accordingly, the present invention is directed to a personal video recorder and control method thereof that substantially obviate one or more problems due to limitations and disadvantages of the related art.

An object of the present invention is to provide a PVR system and control method thereof, which is appropriate for recording, editing (mixing), replaying videos of various video appliances such as a digital camcorder as well as a digital broadcasting video.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a personal video recorder according to the present invention includes a decoder selecting at least one of a plurality of reception video streams to decode the selected video stream, a PVR engine reading a first index file including video features and addresses of previously stored video streams, the PVR engine generating a second index file including video features and addresses of the selected video stream, the PVR engine links the first and second index files to each other to combine the previously stored video stream and the selected video stream, and a storage means for storing the video streams and the index files corresponding to the video streams.

Preferably, the decoder transforms the selected video stream into a packetized elementary stream (PES).

Preferably, the PVR engine includes a video feature extractor receiving the decoded video stream from the decoder to extract the video feature from the decoded video stream and an index/search engine generating the second index file including the extracted video feature and the addresses of the selected video stream to link the first and second index files to each other.

More preferably, the index/search engine includes a download control unit appending a time stamp indicating a reception time of the selected video stream to the selected video stream, a stream mixer generating the second index file to link the first and second index files to each other according to a user's command, and a conditional access system scrambling the selected video stream for copy prevention.

Preferably, the video features include at least one selected from the group consisting of video size and video type.

Preferably, the PVR engine records a first or last address of the selected video stream in the first index file to link the first and second index files and another last or first address of the previously stored video stream in the second index file.

Preferably, the PVR engine detects a program clock reference (PCR) as a reference clock information from the selected video stream.

More preferably, the PVR engine compensates a difference between a value of the program clock reference of the selected video stream and a value of the program clock reference of the previously stored video stream.

Preferably, the PVR engine changes/sets up a combining sequence of the selected and previously stored video streams according to a user's command.

Preferably, the personal video recorder further includes a user interface providing a recording setup menu including a list of the previously stored video streams and storage option buttons to a user.

Preferably, the personal video recorder further includes a DV (digital video) processing unit transforming a DV-formatted video stream inputted from an external device into an MPEG-formatted video stream to provide the transformed video stream to the decoder.

More preferably, the DV processing unit includes an interface transforming the DV-formatted video stream into a DIF (digital interface formatted) video stream, a DV decoder separating the DIF video stream into a video DIF signal and an audio DIF signal, and an MPEG encoder transforming the video DIF signal into an MPEG-formatted video stream.

In another aspect of the present invention, a method of controlling a personal video recorder includes a step (a) of reading a first index file including video features and addresses of previously stored video streams from a storage means and generating a second index file including another video features and addresses of reception video streams, a step (b) of linking the first and second index files to combine the previously stored video stream and the reception video stream, and a step (c) of storing the video streams and the index files corresponding to the video streams in the storage means.

Preferably, the step of generating the second index file includes the steps of extracting the video feature of the reception video stream and allocating the address of the reception video stream.

Preferably, the method further includes the steps of appending a time stamp indicating a reception time of the reception video stream to the corresponding reception video stream and scrambling the corresponding reception video stream for copy prevention.

Preferably, the video features include at least one selected from the group consisting of video size and video type.

Preferably, the step (b) further includes the step of recording a first or last address of the reception video stream in the first index file to link the first and second index files and another last or first address of the corresponding previously stored video stream in the second index file.

Preferably, the method further includes the steps of detecting a program clock reference (PCR) as a reference clock information from the reception video stream, comparing a value of the program clock reference of the reception video stream to a value of the program clock reference of the previously stored video stream, and compensating a difference between the two program clock reference values.

Preferably, the step (b) includes the step of changing/setting up a combining sequence of the reception and previously stored video streams according to a user's command.

Preferably, the method further includes the step of displaying a recording setup menu including a list of the previously stored video streams and storage option buttons.

Preferably, the method further includes the step of transforming the reception video stream into an MPEG-formatted video stream.

More preferably, the step of transforming the reception video stream includes the steps of transforming the reception video stream into a DIF (digital interface formatted) video stream, separating the DIF video stream into a video DIF signal and an audio DIF signal, and transforming the video DIF signal into the MPEG-formatted video stream.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
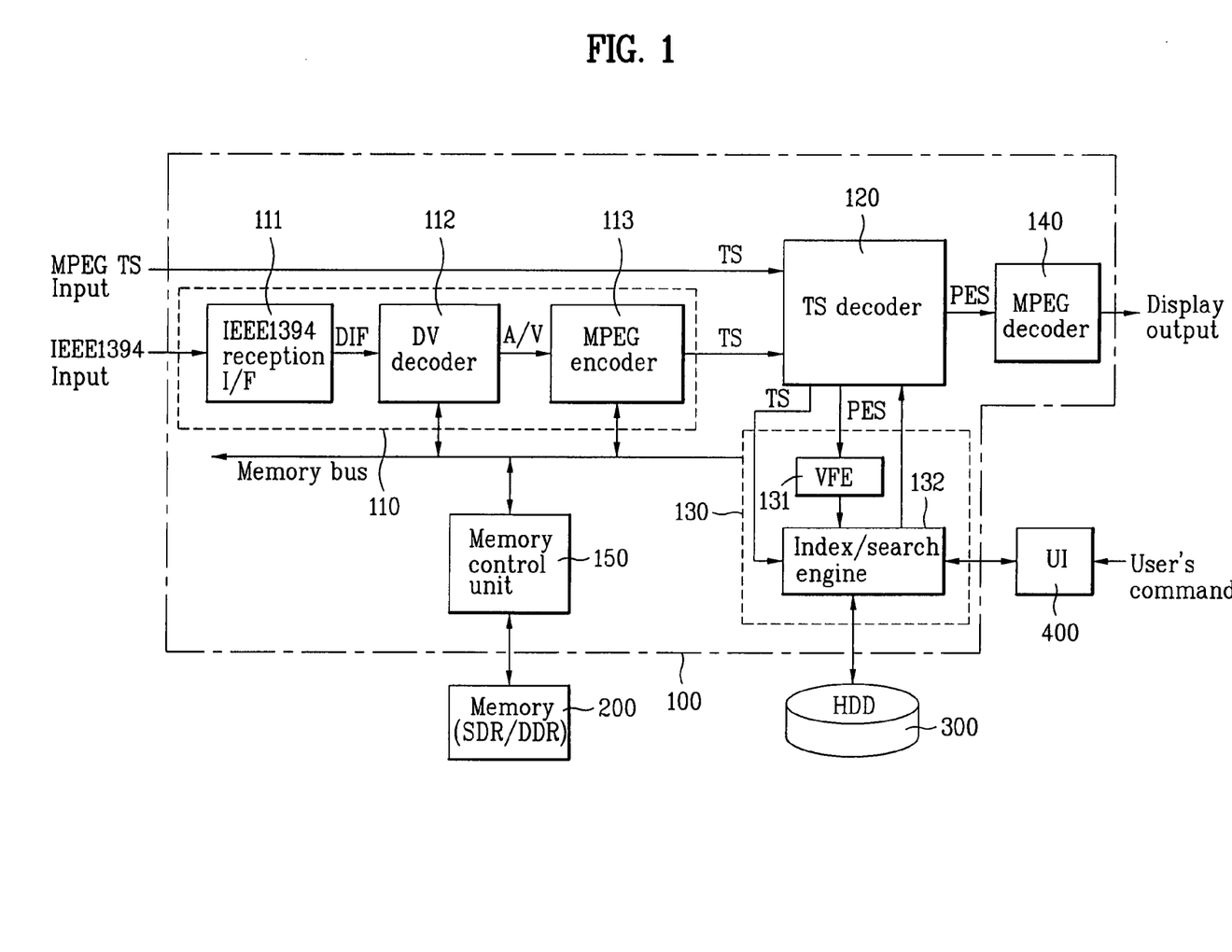
FIG. 1 is a block diagram of a PVR system according to the present invention.

FIG. 1 is a block diagram of a PVR (personal video recorder) system according to the present invention, in which a PVR of the present invention includes a video processing unit 100 implemented by one chip.

Referring to FIG. 1, the video processing unit 100 includes a DV processing unit 110, a PVR engine 130, a TS decoder 120, an MPEG decoder 140, and a memory control unit 150.

The DV processing unit 110 transforms a video signal of DV format inputted via digital camcorder into a transport stream (TS) of MPEG compression format. The DV processing unit 110 includes an IEEE1394 reception interface unit 111 receiving to convert a video signal of DV format to a signal of DIF (digital interface format), a DV system decoder 112 separating the DIF signal into a video DIF signal and an audio DIF signal, and an MPEG encoder 113 encoding the video DIF signal into an MPEG-2 transport stream format as a digital TV standard to output to the TS decoder 120.

The TS decoder 120 receives various signals. For instance, the TS decoder 120 receives a digital TV MPEG transport stream signal provided via TV tuner and demodulator (not shown in the drawing), a DV transport stream signal provided via IEEE1394 port and the DV processing unit 110, a playback transport stream signal provided via HDD 300 and the PVR engine 130, etc. The TS decoder 120 selects at least one MPEG transport stream of digital TV MPEG transport stream, MPEG transport stream from the DV processing unit 110, and playback MPEG transport stream and then decodes the selected MPEG transport stream into a packetized elementary stream (hereinafter abbreviated PES). The MPEG video decoder 140 decodes a video PES outputted from the TS decoder 120 by MPEG decoding algorithm. Moreover, the TS decoder 120 outputs at least one of the digital TV MPEG transport stream and the MPEG transport stream from the DV processing unit 110 to the PVR engine 130.

In case that a user intends to view a video, the TS decoder 120 selects one user-demanding transport stream from the digital TV transport stream, DV transport stream, and playback transport stream, decodes the selected transport stream into a video PES, and then outputs the video PES to the MPEG decoder 140. In case that a user intends to record a video, the TS decoder 120 selects one of the digital TV transport stream and the DV transport stream to output to the PVR engine 130. Simultaneously, the TS decoder 120 decodes the selected transport stream into PES and then outputs the PES to the PVR engine 130. Video display and record may be performed simultaneously or separately.

The PVR engine 130 stores the video transport stream in the HDD 300 and enables to synthesize the video transport stream with a previously stored transport stream. And, the PVR engine 130 enables to search the video transport stream stored in the HDD at any time and to perform various trick plays. The PVR engine 130 receives the digital TV MPEG transport stream or DV MPEG transport stream via the TS decoder 120 and then stores it in the HDD 300 or edits the received transport stream. Moreover, the PVR engine 130 searches data stored in the HDD 300 and provides the data of an MPEG transport stream format to the TS decoder 120 to play back a recorded video. The PVR engine 130 includes a video feature extractor (VFE) 131 and an index/search engine 132. The VFE 131 detects video features such a video type and volume included in the video PES from the video PES outputted from the TS decoder 120 and then provides the detected video features to the index/search engine 132. The video features include header information included in the video PES such as sequence header, picture header, and the like and the video volume and type extracted from macroblock informations. When the transport stream outputted from the TS decoder 120 is stored in the HDD 300, the index/search engine 132 sets up a storage location of the transport stream according to a request of a user interface (UI) 400 and edits the video included in the transport stream. Moreover, the index/search engine 132 controls a search and playback of the video transport stream stored in the HDD 300.

And, the memory control unit 150 controlling data input/output is provided between the video processing unit 100 and the external memory 200. SDR (single data rate) SDRAM or DDR (double data rate) SDRAM is used as the external memory 200 for example.

Figure 2:
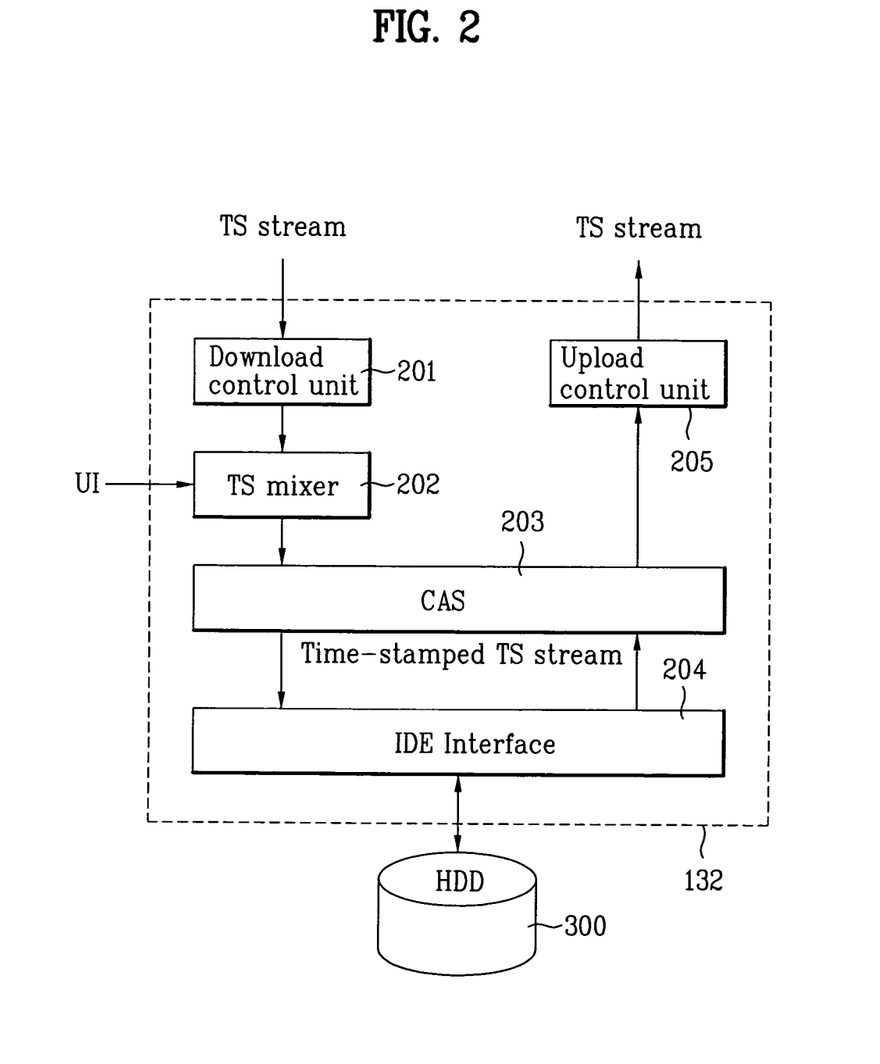
FIG. 2 is a detailed block diagram of an index/search engine in FIG. 1.

FIG. 2 is a detailed block diagram of the index/search engine 132 in FIG. 1.

Referring to FIG. 2, a download control unit 201 receives the transport stream outputted from the TS decoder 120 and then appends a time stamp to the received transport stream. The time stamp indicates a time at which the transport stream is received. When the transport stream is stored in the HDD 300, the download control unit 201 appends the time stamp to the transport stream to prevent a decoding error of the MPEG video decoder 140 due to overflow or underflow of an MPEG decoder buffer (not shown in the drawing). Moreover, the download control unit 201 controls a reception bit rate of the received transport stream.

A TS mixer 202 receives the transport stream from the download control unit 201 and a user's command from the user interface 400. The TS mixer 202 adds the transport stream provided by the download control unit 201 to another transport stream corresponding to a specific program stored in the HDD 300.

A conditional access system (hereinafter abbreviated CAS) 203 scrambles the transport stream to prevent the transport stream outputted from the TS mixer 202 from being copied and descrambles the transport stream read from the HDD 300.

An interface 204 controls a signal and data input/output between the CAS 203 and the HDD 300. The interface 204 is an IDE (integrated derive electronics) or EIDE (enhanced integrated drive electronics) interface. The IDE interface 204 is a sort of interface connecting the HDD 300 and a personal computer (PC). The PC is mostly connected to a large capacity storage device such as HDD, CD-ROM drive, tape driver, etc. In the present invention, the IDE interface 204 is used for connecting the PVR engine 130 within a video decoding chip to the HDD 300.

An upload control unit 205 outputs a playback video stream to the TS decoder 120 while maintaining a precise bit rate by referring to the time stamp appended to the playback video stream read from the HDD 300. In outputting the playback video stream to the TS decoder 120, the upload control unit 205 removes the time stamp from the playback transport stream and then outputs it to the TS decoder 120 by byte unit.

In order to display a DV-formatted video signal provided from a digital camcorder on a screen or to store it in the HDD 300, the corresponding video signal should be transformed into an MPEG-2 TS video stream of digital TV standard. For this, the DV-formatted video signal photographed by the digital camcorder is inputted to the IEEE1394 reception interface 111 of the DV processing unit 110 via the IEEE1394 port, and the inputted video signal is transformed into a video signal of DIF (digital interface format) to be provided to the DV decoder 112. The DV decoder 112 parses the header information of the DIF signal to separate the corresponding DIF signal into a video DIF signal and an audio DIF signal and then provides the video DIF signal to the MPEG encoder 113. After having encoded the video DIF signal by a digital TV MPEG transport stream format, the MPEG encoder 113 outputs the encoded signal to the TS decoder 120 to display the encoded signal on a screen or to store the encoded signal in the HDD 300.

In order to record, reserve to record, or time-shift a video or broadcast program, the TS decoder 120 selects the transport stream corresponding to PID (program identifier) of the video or broadcast program requested to record by a user from the received transport streams only and then outputs the selected transport stream to the index/search engine 132 of the PVR engine 130. Simultaneously, the TS decoder 120 decodes the selected transport stream into PES to extract video features and then outputs the PES to the video feature extractor (VFE) 131. The transport stream provided to the TS decoder 120 to be recorded is at least one of a transport stream of a digital TV broadcast signal received via public wave, cable, or satellite and a DV transport stream.

In order to display a video or broadcast program, the TS decoder 120 just decodes the transport stream corresponding to PID of the program requested by a user among the received transport streams into PES and then outputs the corresponding PES to the MPEG decoder 140. The transport stream provided to the TS decoder 120 to be displayed is at least one of a transport stream of a digital TV broadcast signal received via public wave, cable, or satellite, a DV transport stream, and a transport stream stored in the HDD 300. The transport streams provided to the TS decoder 120 have the same format following the MPEG standard.

The VFE 131 of the PVR engine 130 extracts header informations (e.g., sequence_header, picure_header) and macroblock informations (e.g., DC, motion vector information) from the video PES provided by the TS decoder 120 and then analyzes the features for the video transport stream from the informations. And, the TS mixer 202 generates an index file based on the analyzed video feature informations. The index file includes a volume (size) of the transport stream and information associated with a type of picture included in the transport stream. And, the index file is related to the features for video contents to support editing, fast forward play, reverse play, shot detection, scene segmentation, intelligent playback, and the like of the video or broadcast program stored in the HDD 300.

When the video transport stream is stored in the HDD 300, the index/search engine 132 sets up a storage location of the transport stream according to a request of the user interface (UI) 400 and edits the video included in the transport stream.

Owing to the recent HDD capacity increase and price reduction, needs for storing several moving pictures taken by a camcorder in one electronic file on the HDD 300 or storing a series or weekend drama of a broadcasting station in one electronic file to keep instead of storing them per date are raised. Hence, the TS mixer 202 adds the video or broadcast program that is being recorded to the former video or broadcast program previously stored in the HDD 300.

Figure 3:
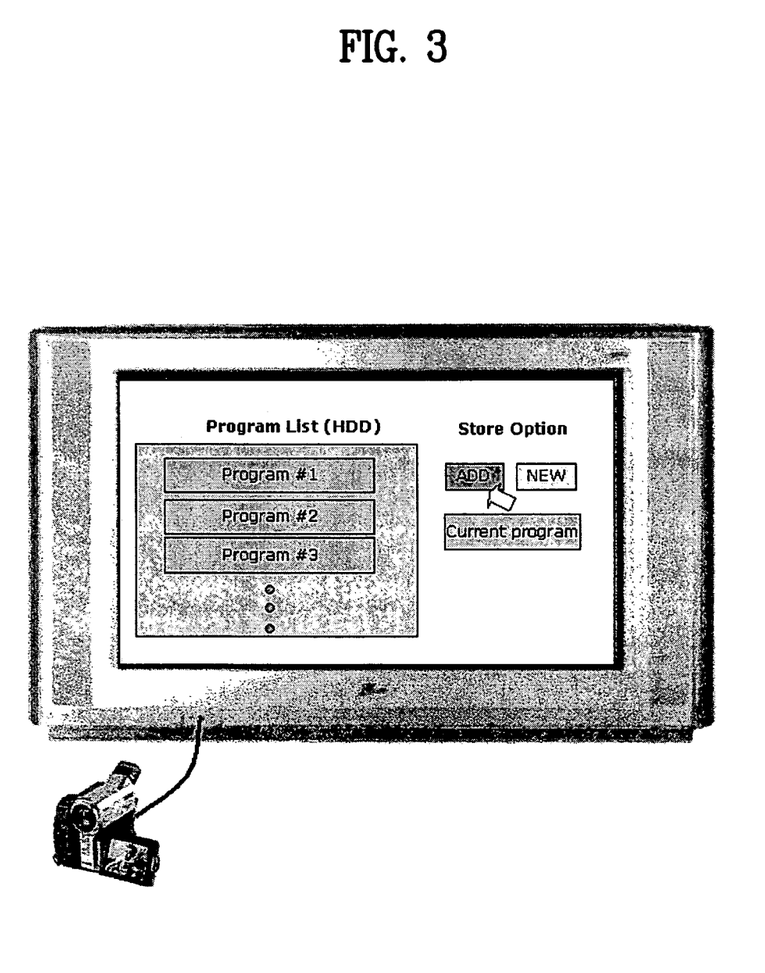
FIG. 3 is an exemplary diagram of a recording setup menu for recording a video or broadcast program according to the present invention.

If a user selects a recording or a reserved recording, the user interface 400 displays a recording setup menu, as shown in FIG. 3, on a TV screen. The user decides whether to add the received video or broadcast program to the previous video or program stored in the HDD 300 or to store the received video or broadcast program in a new program file using the recording setup menu.

For instance, if a user selects an 'ADD' button, a file list of the videos or broadcast programs stored in the HDD 300, as shown in FIG. 3, shows up on a screen. If the user selects a specific one of the videos or broadcast programs from the file list, an index file associated with the selected video or broadcast program file is provided to the TS mixer 202 from the HDD 300. Subsequently, the TS mixer 202 adds the received video or broadcast program to the previously stored video or broadcast program based on the index file and then includes the corresponding two videos or broadcast programs in one file. The TS mixer 202 synthesizes the two videos or broadcast programs based on location information included in the index file such as an address. The transport stream outputted via the TS mixer 202 is scrambled in the CAS 203 to be prevented from being copied and is stored with a previous program file name selected by the user in the HDD 30.

If a user selects a 'New' button, an image for receiving a new video or program file name from the user is displayed on the screen and the recorded video or program is stored with the new file name inputted by the user. If a new file name is automatically generated or inputted by the user, the transport stream outputted from the TS mixer 202 is scrambled by the CAS 203 to be prevented from being copied and is stored with the new file name in the HDD 300.

Figure 4:
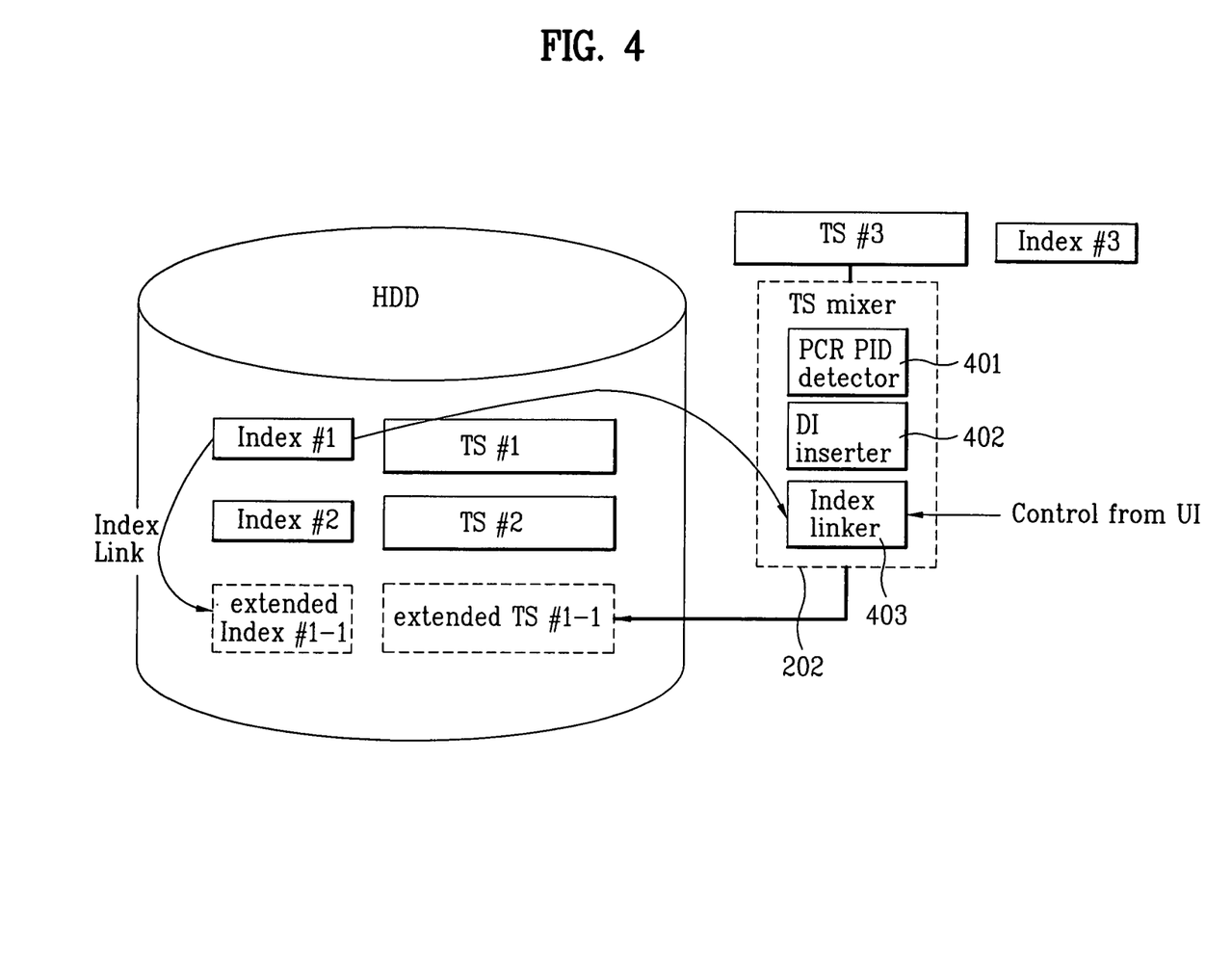
FIG. 4 is a diagram of a relation between TS mixer and HDD according to the present invention.

FIG. 4 is a diagram of a relation between the TS mixer 202 and the HDD 300 for synthesizing two transport streams.

Referring to FIG. 4, a PCR(program clock reference)/PID (program identifier) detector 401 receives a transport stream TS#3 from the download control unit 201 and detects a transport packet including a first program clock reference (PCR) and a first program identifier (PID) from the received transport stream TS#3. The program clock reference (PCR) includes a reference clock information of the transport stream TS#3, and the program identifier (PID) includes information for identifying a video or broadcast program included in the transport stream TS#3. In order to set a picture-I of the received transport stream TS#3 to a first picture, the PCR/PID detector 401 detects a transport packet having the first PCR and PID from the picture-I.

A DI (discontinuity indicator) inserter 402 sets a DI (discontinuity indicator) signal of the transport packet detected to prevent a video discontinuity to '1'. The DI inserter 402 receives the transport packet having the PCR and PID from the PCR/PID detector 401, compares a PCR value included in a stored transport stream TS#1 to a PCR value included in the received transport stream TS#3, and compensates a difference between the two compared PCR values to enable to play the two videos or broadcast programs that will be combined without discontinuity.

An index linker 403 links two corresponding index files Index#1 and Index#3 to synthesize the two transport streams TS#1 and TS#3. For instance, the index linker 403 includes information of a last storage location (address) of the transport stream TS#1 in the index file Index#3 and information for a first storage location (address) of the transport stream TS#3 in the index file Index#1. The addresses of the two transport streams TS#1 and TS#3 stored in the HDD 300 need not to be sequential. Yet, the two videos or broadcast programs included in the synthesized two transport streams TS#1 and TS#3 are continuously displayed according to the address information included in the two index files Index#1 and Index#3. Optionally, the index linker 403 enables to change/ set up a sequential order of the index files Index#1 and Index#3 according to a user's order.

Figure 5:
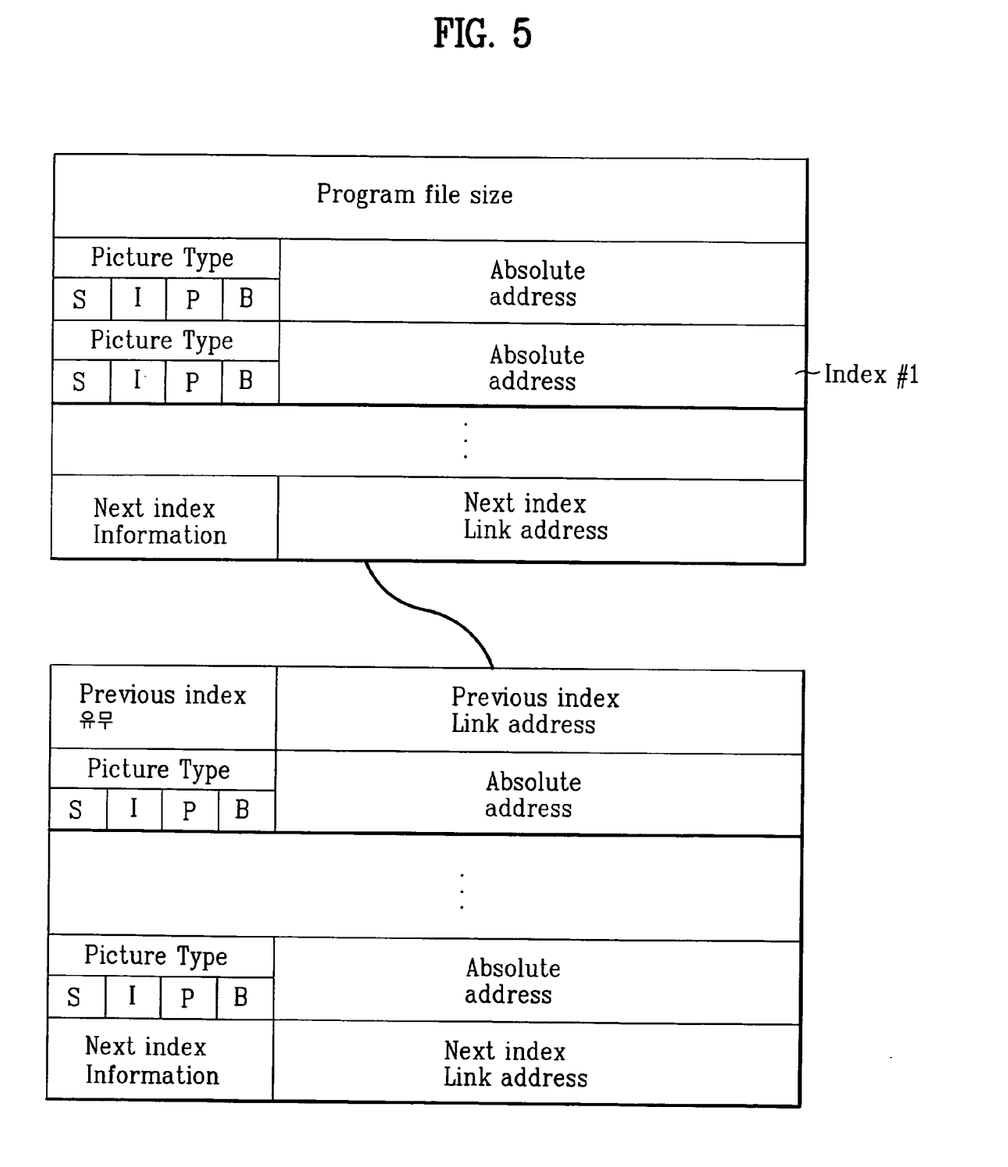
FIG. 5 is a structural diagram of an index file according to the present invention.

FIG. 5 is a structural diagram of the linked two index files Index#1 and Index#3.

Referring to FIG. 5, two index files include a volume or size of two synthesized videos or broadcast programs, picture type (S, I, P, B) of each transport packet, absolute address of each transport packet stored in the HDD 300, and information about presence or non-presence of link of index files (presence or non-presence of next index, presence or non-presence of previous index). Besides, the index file Index#1 includes information of a next index link address that is a first storage location (address) of the transport stream TS#3, and the next index file Index#3 includes information of a previous index link address that is a last storage location of the transport stream TS#1.

Once the index file Index#1 and the next index file Index#3 are linked to each other, the next index link address is recorded in the index file Index#1 and the previous index link address is recorded in the index file Index#3. For example of FIG. 4, the next index link address is a start absolute address of the next transport stream TS#3 stored in the HDD 300, and the previous index link address is a last absolute address of the previous transport stream TS#1. A program file name of the transport stream TS#3 is equal to that of the transport stream TS#1. Hence, if the program file name of the transport stream TS#1 is selected in playing the corresponding video or broadcast program, the transport streams TS#1 and TS#3 are recognized as one program to be played back. In doing so, a sequence of reading the transport streams stored in the HDD 300 may be reverse to a sequence of the downloading process or can be decided according to a user's request. The index/ search engine 132 enables to change/set up a display sequence of the recorded videos or broadcast programs according to a user's command.

Referring to FIG. 3, if a user selects a program file Program#1 from a playable program file list, the index/search engine 132 reads the corresponding transport stream from the HDD 300 by referring to the index file Index#1 of the selected program file Program#1. In doing so, the transport streams TS#1 and TS#3 are sequentially read by the index file Index#1. The CAS 203 descrambles the transport streams TS#1 and TS#3 if the read transport streams TS#1 and TS#3 are scrambled and then outputs them to the upload control unit 205. The upload control unit 205 transfers the transport streams TS#1 and TS#3 to the TS decoder 120 while keeping a precise bit rate by referring to time stamps appended to the descrambled transport streams TS#1 and TS#3. This is to prevent a decoding error from occurring due to overflow or underflow of the MPEG decoder buffer. In doing so, the time stamps are removed from the transport streams TS#1 and TS#3 to be transferred to the TS decoder 120. Namely, the time stamps are just referred to in playback. The TS decoder 120 decodes the inputted playback transport streams TS#1 and TS#3 into PES to output to the MPEG decoder 140.

Meanwhile, a structure of the index file is characterized in facilitating to link to a transport stream newly added to another sector within the HDD 300 via link address as well as in facilitating to find to upload a specific transport stream within the HDD 300 for such a trick play as a fast forward play, fast backward play, reverse play, and the like.

As mentioned in the foregoing description, the PVR apparatus having the index file structure according to the present invention enables to add a new program to a previous program. Moreover, in synthesizing at least two programs within the HDD into one or simulatenously storing two transport streams in the HDD, the corresponding programs or transport streams are stored in another sector within the HDD and can be simply recognized as one via index link.

Accordingly, the PVR system and method of editing a recorded program according to the present invention have the following advantages or effects.

First of all, the present invention enables to efficiently support storage, editing, search, and the like within the HDD for the videos of digital camcorder DV format as well as the digital TV program via one unified video decoding chip, thereby enabling to reduce a system price and to raise system integration.

Secondly, the present invention supports an editing function of adding a real-time bit stream stored in the HDD to a specific previous video stream and facilitates to diversify playback, trick play, and the like of the stored video contents. Thus, the present invention provides various video services and enables to enhance an additional value of the digital video recorder.

Finally, the present invention is essential to digital TV or video recorder applied fields, thereby providing a digital video decoder of high performance for video contents storage and search using HDD and reinforcing digital TV technical competition with other companies.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A video recorder, comprising:
    a storage unit configured to store a first video stream of at least one program together with at least a first index file, the first index file including video feature information of the first video stream and storage address information that indicates a storage location of the first video stream within the storage unit;
    a user interface configured to display to a user a list of available programs when the user selects to add a second video stream that is received by the video recorder from an external source to link with one of the available programs so as to combine two programs into one file; and
    a Personal Video Recorder (PVR) configured to
        read the first index file associated with the selected first video stream, generate a second index file including video feature information of the second video stream and storage address information that indicates a storage location of the second video stream within the storage unit, and
        combine the first video stream and the second video stream by setting a discontinuity indicator signal to a predetermined value in order to link the first and second index files to each other to form a continuously displayable video stream file comprising the first video stream and second video stream such that a selection of the first video stream for reproduction playback will result in the reproduction playback of both the first video stream and second video stream without interruption.

2. The video recorder of claim 1, further comprising:
    a decoder configured to select the second video stream from a plurality of received video streams and to decode the selected second video stream,
    wherein the decoder is further configured to transform the selected second video stream into a packetized elementary stream (PES).

3. The video recorder of claim 1, wherein the PVR engine comprises:
    a video feature extractor configured to extract the video feature from the second video stream; and
    an index/search engine configured to generate the second index file including the extracted video feature information and the storage address information of the second video stream to link the first and second index files to each other.

4. The video recorder of claim 3, wherein the index/search engine comprises:
    a download control unit configured to append a time stamp indicating a reception time of the second video stream to the second video stream;
    a stream mixer configured to generate the second index file to link the first and second index files to each other according to a user's command; and
    a conditional access system configured to scramble the second video stream for copy prevention.

5. The video recorder of claim 1, wherein each video feature information includes at least one of video size and video type.

6. The video recorder of claim 1, wherein the PVR engine
    records a first or last storage address location of the second video stream in the first index file, and
    records a last or first storage address location of the first video stream in the second index file to link the first and second index files.

7. The video recorder of claim 1, wherein the PVR engine detects a program clock reference (PCR) as a reference clock information from the second video stream.

8. The video recorder of claim 7, wherein the PVR engine compensates a difference between a value of the program clock reference of the second video stream and a value of a program clock reference of the first video stream.

9. The video recorder of claim 1, wherein the PVR engine changes/sets up a combining sequence of the first video stream and the second video stream according to a user's command.

10. The video recorder of claim 1, further comprising:
    a DV (digital video) processing unit configured to transform a DV-formatted video stream into an MPEG-formatted video stream when the second video stream is inputted from an external device.

11. The video recorder of claim 10, wherein the DV processing unit comprises:
    an interface configured to transform the DV-formatted video stream into a DIF (digital interface formatted) video stream;
    a DV decoder configured to separate the DIF video stream into a video DIF signal and an audio DIF signal; and
    an MPEG encoder configured to transform the video DIF signal into the MPEG-formatted video stream.

12. A method of controlling a video recorder, the method comprising:
    storing in a storage unit a first video stream of at least one program together with at least a first index file, the first index file including video feature information of the first video stream and storage address information that indicates a storage location of the first video stream within the storage unit;

displaying to a user a list of available programs when the user selects to add a second video stream that is received by the video recorder from an external source to link with one of the available programs so as to combine two programs into one file or to make a new file;

selecting the first video stream from available video streams selected by the user and linking the first video stream with the second video stream;

reading the first index file and generating a second index file including video feature information of the second video stream and storage address information that indicates a storage location of the second video stream within the storage unit; and setting a discontinuity indicator signal to a predetermined value in order to link the first index file and the second index file to each other to form a continuously displayable video stream file such that a selection of the first video stream for reproduction playback will result in the reproduction playback of both the first video stream and second video stream without interruption.

13. The method of claim 12, wherein the step of generating of the second index file comprises:
extracting the video feature information of the second video stream; and
allocating the storage address of the second video stream.

14. The method of claim 12, further comprising:
appending a time stamp indicating a reception time of the second video stream thereto; and
scrambling the second video stream for copy prevention.

15. The method of claim 12, wherein each video feature information includes at least one of video size and video type.

16. The method of claim 12, wherein the step of linking of the first and second index files comprises:
recording a first or last storage address location of the second video stream in the first index file; and
recording a last or first storage address location of the first video stream in the second index file.

17. The method of claim 12, further comprising:
detecting a program clock reference (PCR) as a reference clock information from the second video stream;
comparing a value of the program clock reference of the second video stream to a value of a program clock reference of the first video stream; and
compensating a difference between the two program clock reference values.

18. The method of claim 12, wherein the step of linking of the first and second index files comprises:
changing or setting up a combining sequence of the first video stream and the second video stream according to a user's command.

19. The method of claim 12, further comprising transforming the second video stream from a DV-formatted video stream into an MPEG-formatted video stream when the second video stream is inputted from an external device.

20. The method of claim 19, wherein the step of transforming of the second video stream comprises:
transforming the second video stream into a DIF (digital interface formatted) video stream;
separating the DIF video stream into a video DIF signal and an audio DIF signal; and
transforming the video DIF signal into the MPEG-formatted video stream.

21. A video recorder, comprising:
a storage unit configured to store a first video stream of at least one program together with at least a first index file, the first index file including video feature information of the first video stream and storage address information that indicates a storage location of the first video stream within the storage unit;
a user interface configured to display to a user a list of available programs when the user selects to add a second video stream that is currently being broadcasted to link with one of the available programs so as to combine two programs into one file; and
a Personal Video Recorder (PVR) engine configured to
read the first index file associated with the selected first video stream,
generate a second index file including video feature information of the second video stream and storage address information that indicates a storage location of the second video stream within the storage unit, and
combine the first video stream and the second video stream by setting a discontinuity indicator signal to a predetermined value in order to link the first and second index files to each other to form a continuously displayable video stream file comprising the first video stream and second video stream such that a selection of the first video stream for reproduction playback will result in the reproduction playback of both the first video stream and second video stream without interruption.

* * * * *